US010827200B2

(12) United States Patent
Stepin et al.

(10) Patent No.: US 10,827,200 B2
(45) Date of Patent: Nov. 3, 2020

(54) MIXED DOMAIN COLLABORATIVE IN-LOOP FILTER FOR LOSSY VIDEO CODING

(71) Applicant: Huawei Technologies Co., Ltd., Shenzhen (CN)

(72) Inventors: Victor Alexeevich Stepin, Moscow (RU); Roman Igorevich Chernyak, Moscow (RU); Ruslan Faritovich Mullakhmetov, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/450,283

(22) Filed: Jun. 24, 2019

(65) Prior Publication Data
US 2019/0313125 A1    Oct. 10, 2019

Related U.S. Application Data

(63) Continuation of application No. PCT/RU2016/000919, filed on Dec. 23, 2016.

(51) Int. Cl.
*H04N 19/126* (2014.01)
*H04N 19/19* (2014.01)
(Continued)

(52) U.S. Cl.
CPC ......... *H04N 19/635* (2014.11); *H04N 19/117* (2014.11); *H04N 19/126* (2014.11);
(Continued)

(58) Field of Classification Search
CPC .................................................. H04N 19/635
See application file for complete search history.

(56) References Cited

U.S. PATENT DOCUMENTS 10,623,738 B2 *   4/2020   Liu ...................... H04N 19/117
2006/0294171 A1 *  12/2006  Bossen .................. H04N 19/59
                                                          708/300
(Continued)

FOREIGN PATENT DOCUMENTS

CN          101257630 A      9/2008
CN          102026000 A      4/2011
(Continued)

OTHER PUBLICATIONS

Chen et al., "Classified Quadtree-based Adaptive Loop Filter," 2011 IEEE International Conference on Multimedia and Expo, Barcelona, Spain, pp. 1-6, Institute of Electrical and Electronics Engineers, New York, New York (Jul. 11-15, 2011).
(Continued)

*Primary Examiner* — Irfan Habib
(74) *Attorney, Agent, or Firm* — Leydig, Voit & Mayer, Ltd.

(57) ABSTRACT

A video coding apparatus for encoding or decoding a frame of a video, the video coding apparatus comprising a frame reconstruction unit configured to reconstruct the frame, a parameter determination unit configured to determine one or more filter parameters, based on one or more first parameters which are based on the reconstructed frame and one or more second parameters which are based on codec signaling information, and a mixed-domain filtering unit configured to filter in a frequency domain and a pixel domain the reconstructed frame based on the determined filter parameters to obtain a filtered frame.

14 Claims, 12 Drawing Sheets

(51) Int. Cl.
*H04N 19/82* (2014.01)
*H04N 19/635* (2014.01)
*H04N 19/117* (2014.01)
*H04N 19/61* (2014.01)
*H04N 19/176* (2014.01)
*H04N 19/154* (2014.01)

(52) U.S. Cl.
CPC ......... *H04N 19/154* (2014.11); *H04N 19/176* (2014.11); *H04N 19/19* (2014.11); *H04N 19/61* (2014.11); *H04N 19/82* (2014.11)

(56) References Cited

U.S. PATENT DOCUMENTS

| | | | |
|---|---|---|---|
| 2007/0140574 A1* | 6/2007 | Yamaguchi | H04N 19/86 382/233 |
| 2010/0158103 A1 | 6/2010 | Ye et al. | |
| 2010/0278267 A1* | 11/2010 | Lai | H04N 19/117 375/240.16 |
| 2010/0309377 A1 | 12/2010 | Schoenblum et al. | |
| 2011/0150080 A1* | 6/2011 | Watanabe | H04N 19/117 375/240.03 |
| 2011/0222597 A1 | 9/2011 | Xu et al. | |
| 2011/0274158 A1 | 11/2011 | Fu et al. | |
| 2012/0177104 A1 | 7/2012 | Budagavi et al. | |
| 2012/0288213 A1 | 11/2012 | Amon et al. | |
| 2013/0003871 A1 | 1/2013 | Bjontegaard et al. | |
| 2013/0094569 A1 | 4/2013 | Chong et al. | |
| 2013/0094572 A1* | 4/2013 | Van der Auwera | H04N 19/126 375/240.03 |
| 2013/0188733 A1* | 7/2013 | Van der Auwera | H04N 19/124 375/240.24 |
| 2013/0215974 A1* | 8/2013 | Chong | H04N 19/463 375/240.24 |
| 2013/0216117 A1 | 8/2013 | Mercuriev | |
| 2014/0192892 A1* | 7/2014 | Van der Auwera | H04N 19/176 375/240.24 |
| 2014/0369426 A1* | 12/2014 | Li | H04N 19/30 375/240.29 |
| 2015/0016551 A1* | 1/2015 | Esenlik | H04N 19/463 375/240.29 |
| 2017/0201770 A1 | 7/2017 | Chen et al. | |
| 2017/0264901 A1* | 9/2017 | Narroschke | H04N 19/117 |
| 2018/0249159 A1 | 8/2018 | Narroschke et al. | |
| 2018/0295364 A1* | 10/2018 | Liu | H04N 19/174 |
| 2019/0238845 A1* | 8/2019 | Zhang | H04N 19/157 |
| 2019/0313124 A1* | 10/2019 | Stepin | H04N 19/117 |
| 2019/0313125 A1* | 10/2019 | Stepin | H04N 19/61 |
| 2019/0394464 A1* | 12/2019 | Stepin | H04N 19/82 |
| 2020/0029096 A1* | 1/2020 | Rusanovskyy | H04N 19/439 |

FOREIGN PATENT DOCUMENTS

| | | |
|---|---|---|
| CN | 102292990 A | 12/2011 |
| CN | 102342101 A | 2/2012 |
| CN | 102763415 A | 10/2012 |
| CN | 102972022 A | 3/2013 |
| EP | 1841230 A1 | 10/2007 |
| EP | 2375747 A1 | 10/2011 |
| WO | 2013155084 A1 | 10/2013 |

OTHER PUBLICATIONS

"Series H: Audiovisual and Multimedia Systems Infrastructure of audiovisual services—Coding of moving video, Advanced video coding for generic audiovisual services," ITU-T H.264, pp. 1-804, International Telecommunication Union, Geneva, Switzerland (Oct. 2016).

"Series H: Audiovisual and Multimedia Systems Infrastructure of audiovisual services—Coding of moving video—High efficiency video coding," ITU-T H.265, pp. 1-634, International Telecommunication Union, Geneva, Switzerland (Apr. 2015).

Maggioni et al., "Video Denoising, Deblocking, and Enhancement Through Separable 4-D Nonlocal Spatiotemporal Transforms," IEEE Transactions on Image Processing, vol. 21, No. 9, XP011492148 pp. 3952-3966, Institute of Electrical and Electronics Engineers, New York, New York (Sep. 2012).

Zhang et al., "Video Compression Artifact Reduction via Spatio-Temporal Multi-Hypothesis Prediction," IEEE Transactions on Image Processing, vol. 24, No. 12, XP011589709, pp. 6048-6061, Institute of Electrical and Electronics Engineers, New York, New York (Dec. 2015).

Zhang et al., "Low-Rank Decomposition-Based Restoration of Compressed Images via Adaptive Noise Estimation," IEEE Transactions on Image Processing, vol. 25, No. 9, XP011617745, pp. 4158-4171, Institute of Electrical and Electronics Engineers, New York, New York (Sep. 2016).

Zhang et al., "Image postprocessing by Non-local Kuan's filter," Journal of Visual Communication and Image Representation, vol. 22, No. 3, XP028172660, pp. 251-262, Elsevier, Amsterdam, Netherlands (Apr. 2011).

Dabov et al., "Video denoising by sparse 3D transform-domain collaborative filtering," 15th European Signal Processing Conference, Poznan, Poland, XP032772966, pp. 145-149, Institute of Electrical and Electronics Engineers, New York, New York (Sep. 2007).

Zhang et al., "Transform-domain in-loop filter with block similarity for HEVC," Visual Communications and Image Processing (VCIP), Chengdu, China, XP055405520, pp. 1-4, Institute of Electrical and Electronics Engineers, New York, New York (Nov. 27-30, 2016).

Dabov et al., "Image Denoising by Sparse 3-D Transform-Domain Collaborative Filtering," IEEE Transactions on Image Processing, vol. 16, No. 8, XP011485829, pp. 2080-2095, Institute of Electrical and Electronics Engineers, New York, New York (Aug. 2007).

* cited by examiner $B = \{b_1, b_2, ..., b_M\} = CreatePartitions(\hat{S}, n)$ - Partitioning procedure, n - partition size For each $b_i$ in $B$ -Block Matching Procedure (Find k closest blocks for $b_i$ in $\hat{S}$ using MSE metric):

$P_i = BlockMatch(\hat{S}, b_i)$, where $P_i = (b_i, p_i^1, p_i^2, ..., p_i^{k-1})$ -2D transform for each pixel patch: $F_i = 2Dtransform(P_i)$

General case

$G_i = Func(F_i, N)$

Wiener filter
- Stack transform for each patch group $TF_i = \|g_i^*\| = StackTransform(F_i)$

- Frequency Impulse Response calculation for stack spectrum $G_i(\Omega) = |g_{\infty}^i(\Omega)|$ $g_{wo}^i(\Omega) = \dfrac{(f_{\infty}^i(\Omega))^2}{(f_{\infty}^i(\Omega))^2 + N^2}$

Partitioning $B = \{b_1, b_2, \ldots, b_M\} = CreatePartitions(S, n)$

For each $b_i$ in $B$

Block matching $P_i = BlockMatch(S, b_i)$

Forward 2D transform $F_i = 2Dtransform(P_i)$ $R_i = FreqCollaborativeFiltering(F_i, G_i)$

Inverse 2D transform $\tilde{P}_i = Inverse2DTransform(R_i)$

Pixel domain collaborative filtering $O = SameBlockAvg(\tilde{P}_0, \tilde{P}_1, \ldots, \tilde{P}_M)$

Partitioning $B = \{b_1, b_2, \ldots, b_M\} = CreatePartitions(S, n)$

For each $b_i$ in $B$

Block matching $P_i = BlockMatch(S, b_i)$

Forward 2D transform $F_i = 2DTransform(P_i)$

Secondary stack transform $TF_i = \|\psi_{xx}^{r_i}\| = StackTransform(F_i)$

Frequency domain filtering $\widetilde{TF_i} = TF_i \circ G_i$

Inverse secondary transform $R_i = InverseStackTransform(\widetilde{TF_i})$

Inverse 2D transform $\widetilde{P_i} = Inverse2DTransform(R_i)$

Pixel domain collaborative filtering $O = SameBlockAvg(\widetilde{P}_0, \widetilde{P}_1, \ldots, \widetilde{P}_M)$

MIXED DOMAIN COLLABORATIVE IN-LOOP FILTER FOR LOSSY VIDEO CODING

CROSS-REFERENCE TO RELATED APPLICATIONS

This application is a continuation of International Application No. PCT/RU2016/000919, filed on Dec. 23, 2016, the disclosure of which is hereby incorporated by reference in its entirety.

TECHNICAL FIELD

The present invention relates to a video coding apparatus, a system comprising a video encoding apparatus and a video decoding apparatus, and a method for video coding. The present invention also relates to a computer-readable storage medium storing program code, the program code comprising instructions for carrying out a method for video coding.

BACKGROUND

Many recent video compression techniques are used by hybrid video codecs such as H.264/AVC and H.265/HEVC. Powerful video compression tools include in-loop filtering (for improving prediction, that is, inter-prediction or intra-prediction) and post filtering for improving the decoded video.

In a hybrid video codec, a reconstructed (decoded) frame is used for predicting next frames. Quantization noise in the decoded frame makes the prediction worse. Noise of the input sensor (e.g., noise of the image sensor in a video camera) also can make prediction worse. Different in-loop filters can decrease these kinds of noise jointly or independently.

The decoder typically comprises an in-loop filter similar to the in-loop filter of the encoder. The in-loop filter of the decoder improves the prediction signal. The post filter improves the decoded image. In many decoders, the post filter and the in-loop filter are identical.

The most familiar in-loop filter is the Adaptive Loop Filter (ALF). This filter was proposed in a Moving Picture Experts Group (MPEG) standardization meeting for use in the Next Generation Video codec. Each reconstructed frame is divided into a set of small macroblocks (super-pixels) and each macroblock is filtered by the adaptive loop filter.

An Adaptive Loop Filter comprises three blocks: a parameter estimation block, a pixel domain filtering block and an application map block.

In the encoder, the parameter estimation block estimates a two-dimensional (2D) pixel domain Wiener filter impulse response for each macroblock based on matching (correlation) between original and filtered reconstructed images. Then these impulse responses are quantized and transferred to the Entropy encoder. The entropy encoder inserts encoded filter parameters into the output bitstream. The output bitstream is transferred from the encoder to the decoder. In the decoder, the Entropy decoder recovers the Wiener filter impulse response for each macroblock and transfers filter parameters to the pixel domain filtering block for use in the filtering process.

In the decoder and in the encoder, the respective pixel domain filtering block filters the reconstructed image in the pixel domain according to filter parameters from the parameter estimation block.

The application map block determines a filter application map which indicates those super-pixels to which the filter shall be applied.

An Adaptive Loop Filter can have the following base features:
  The Filter Impulse response can be derived by matching the filtered reconstructed image to the original image, e.g. by requiring the filter impulse to minimize the square error between filtered reconstructed and original images
  Filter parameters are transferred from the encoder to the decoder
  Filtering is performed in the pixel domain
  Filter is applied as in-loop (prediction improvement) and post (decoded picture improvement) filter
  An Application map is built based on a rate distortion optimization (RDO) process
  Only quantization noise is suppressed by the filter Despite many advantageous features of the ALF filter structure, there is still a need for improvements in image and video coding.

SUMMARY

The objective of the present invention is to provide a video coding apparatus and a system comprising a video encoding apparatus and a video decoding apparatus, wherein the video coding apparatus and the system overcome one or more of the above-mentioned problems of the prior art.

A first aspect of the invention provides a video coding apparatus for encoding or decoding a frame of a video, the video coding apparatus comprising:
  a frame reconstruction unit configured to reconstruct the frame,
  a parameter determination unit configured to determine one or more filter parameters, based on one or more first parameters which are based on the reconstructed frame and one or more second parameters which are based on codec signaling information, and
  a mixed-domain filtering unit configured to filter in a frequency domain and a pixel domain the reconstructed frame based on the determined filter parameters to obtain a filtered frame.

The video coding apparatus can be an encoder or a decoder. It is understood that the mixed-domain filtering unit does not necessarily filter each frame completely. In embodiments, filtering the reconstructed frame can refer to filtering only one or more blocks of the frame.

The video coding apparatus of the first aspect has the advantage that the filter parameters can be derived on the decoder-side and do not need to be encoded into the bitstream, thus an improved coding efficiency can be achieved.

The reconstructed frame can be divided into a set of small macroblocks and then each macroblock can be filtered by the mixed-domain filtering unit. In this regard, it is understood that "reconstructed frame" can also refer to one or more blocks of the reconstructed frame, and "filtering the reconstructed frame" can also refer to filtering one or more blocks of the reconstructed frame.

Preferably, the parameter determination unit is configured to determine the one or more frame filter parameters based only on the reconstructed frame and not on the original frame on the encoder side. Since the parameter determination unit thus does not require the original frame, the parameters can be determined in the same way based on the reconstructed frame, both at the encoder side and at the decoder side (where the original frame is not available).

In a first implementation of the video coding apparatus according to the first aspect, the video coding apparatus is configured to store the filtered frame in a decoder picture buffer for next frame prediction and to output the filtered frame.

For example, the filtered frame can be output to an end user. This has the advantage that the user can be provided with a filtered and improved version of the frame of the video.

In a second implementation of the video coding apparatus according to the first aspect as such or according to the first implementation of the first aspect, the apparatus further comprises an application map unit configured to determine where filtering should be implemented based on a weighted function of a prediction improvement and an output video degradation.

This has the advantage that filtering can be omitted in areas where it does not lead to an overall improvement.

The prediction improvement can be, for example, due to sensor and quantization noise suppression. On the other hand, sensor noise suppression and edge distortion can cause a degradation of the (perceived) quality of the output video.

Preferably, the application map unit is implemented at the encoder side, and corresponding signaling information is transferred to the decoder side.

In a third implementation of the video coding apparatus according to the first aspect as such or according to any of the preceding implementations of the first aspect, a plurality of reconstructed frames are stored in a decoded picture buffer and the parameter determination unit is configured to determine the one or more first parameters based on one or more frames of the decoded picture buffer.

In a fourth implementation of the video coding apparatus according to the first aspect as such or according to any of the preceding implementations of the first aspect, the parameter determination unit is configured to estimate the original frame from the reconstructed frame and determine the first parameters based on the estimated original frame.

Original signal estimating allows roughly removing sensor and quantization noise and better estimating original signal parameters (for example an original signal spectrum). Thus, an improved determination of the first parameters can be performed based on the estimated original frame compared to determining the first parameters based on the reconstructed frame.

In a fifth implementation of the video coding apparatus according to the first aspect as such or according to any of the preceding implementations of the first aspect, the parameter determination unit is configured to determine a quantization noise value from the codec signaling information and determine the second parameters based on the derived quantization noise value.

This has the advantage that the filter parameters can be determined with higher accuracy.

Preferably, the quantization noise value can be derived analytically from the codec signaling information.

Preferably, the parameter determination unit is configured to analytically derive the quantization noise value from a quantization parameter (QP) of the codec signaling information.

In a sixth implementation of the video coding apparatus according to the first aspect as such or according to any of the preceding implementations of the first aspect, the parameter determination unit is configured to determine the filter parameters by:
  partitioning the estimated original frame into blocks, and
  for each of the blocks:
    determining a cluster of patches that are similar to the block,
    2D-transforming the cluster of patches to obtain transformed patches, and
    determining the first parameters based on the transformed patches.

Experiments have shown that this represents a particularly efficient way of determining the filter parameters.

In a seventh implementation of the video coding apparatus according to the first aspect as such or according to any of the preceding implementations of the first aspect, the parameter determination unit is configured to determine, for each of the blocks, the filter parameters based on the transformed patches by:
  regrouping elements of the transformed patches to obtain a matrix $T_j$, wherein each row of the matrix $T_j$ comprises frequency components with same spatial frequencies,
  transforming the matrix $T_j$ to obtain a transformed matrix $tf_{v,w}^i$, wherein each row of the matrix $tf_{v,w}^i$ is a one-dimensional (1D) transform of a corresponding row of matrix $T_j$, and
  determining the filter parameters $g_{v,w}^i$ as:

$$g_{vw}^i(\Omega) = \frac{(tf_{vw}^i(\Omega))^2}{(tf_{vw}^i(\Omega))^2 + N^2}$$

wherein $\Omega$ is a column number in matrix $tf_{vw}^i$, spatial frequencies v,w correspond to a j-th row of matrix $tf_{vw}^i$ and N is a quantization noise value derived from the codec signaling information.

In an eighth implementation of the video coding apparatus according to the first aspect as such or according to any of the preceding implementations of the first aspect, the mixed-domain filtering unit is configured to, for each of a set of blocks of the reconstructed frame:
  determine a set of patches that are similar to the block,
  2D-transform the patches into frequency domain to obtain frequency-domain patches,
  perform collaborative filtering of the frequency-domain patches in frequency domain to obtain filtered transformed frequency-domain patches,
  inverse 2D transform the filtered transformed frequency-domain patches in frequency domain to obtain filtered patches, and
  perform collaborative filtering of the filtered patches in pixel domain along pixel patches from different sets of patches with the same spatial coordinates.

Preferably, the blocks of the reconstructed frame cover the entire reconstructed frame. The blocks can represent a segmentation of the reconstructed frame (i.e., they are non-overlapping) or they can cover the reconstructed frame in an overlapping manner.

In a ninth implementation of the video coding apparatus according to the first aspect as such or according to any of the preceding implementations of the first aspect, the mixed-domain filtering unit is configured to perform, for each of the blocks, the collaborative filtering based on the transformed patches by:
  regrouping elements of the transformed patches to obtain a matrix $T_j$, wherein each row of the matrix $T_j$ comprises frequency components with same spatial frequencies, transforming the matrix $T_i$ to obtain a transformed matrix $tf_{vw}^i$, wherein each row of the matrix $tf_{vw}^i$ is a 1D transform of a corresponding row of matrix $T_i$, and perform filtering by multiplying each element of matrix $tf_{vw}^i$ by a filter frequency impulse response $g(\Omega)_{vw}^i$, wherein $\Omega$ is a column number in matrix $tf_{vw}^i$ and spatial frequencies v,w correspond to a j-th row of matrix $tf_{vw}^i$.

In a tenth implementation of the video coding apparatus according to the first aspect as such or according to any of the preceding implementations of the first aspect, the 2D transformation is a Haar wavelet transform and/or the 1D transformation is a Hadamard transform.

In an eleventh implementation of the video coding apparatus of the second aspect, the adaptive_filtering_flag flag is used to indicate that the mixed-domain filtering unit should be used to filter a frame, the frame_level_usage_flag flag is used to indicate that the entire reconstructed frame should be filtered, the macroblock size field is used to indicate a macroblock size which should be used for filtering, and/or the use_filtered_mb_flag flag is used to indicate whether a filtered macroblock should be used.

A second aspect of the invention refers to a system comprising a video encoding apparatus according to one of the previous claims and a video decoding apparatus according to one of the previous claims, wherein the parameter determination unit of the video encoding apparatus is configured to determine the filter parameters in the same way as the parameter determination unit of the video decoding apparatus.

This system has the advantage that no transmission of filter parameters from the encoder side to the decoder side is required. Thus, a coding efficiency can be improved.

A third aspect of the invention refers to a method for video coding, the method comprising:

reconstructing a frame of the video, determining one or more filter parameters based on one or more first parameters which are based on the reconstructed frame and one or more second parameters which are based on codec signaling information, and filtering in a frequency domain and in a pixel domain the reconstructed frame based on the determined filter parameters to obtain a filtered frame.

The methods according to the third aspect of the invention can be performed by the video coding apparatus according to the first aspect of the invention. Further features or implementations of the method according to the second aspect of the invention can perform the functionality of the video coding apparatus according to the first aspect of the invention and its different implementation forms.

A fourth aspect of the invention refers to a computer-readable storage medium storing program code, the program code comprising instructions that when executed by a processor carry out the method of the third aspect.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, modifications on these embodiments are possible without departing from the scope of the present invention as defined in the claims.

FIG. 7 is a pseudo-code of filter parameter estimation in details for the general case and for the Wiener collaborative filter in accordance with a further embodiment of the invention, FIG. 10 is a pseudo-code of the mixed-domain collaborative filter in detail for the general case in accordance with a further embodiment of the invention, FIG. 11 is a pseudo code for a collaborative filter in mixed domain for the case of Wiener filtering in accordance with a further embodiment of the invention.

DETAILED DESCRIPTION

Figure 1:
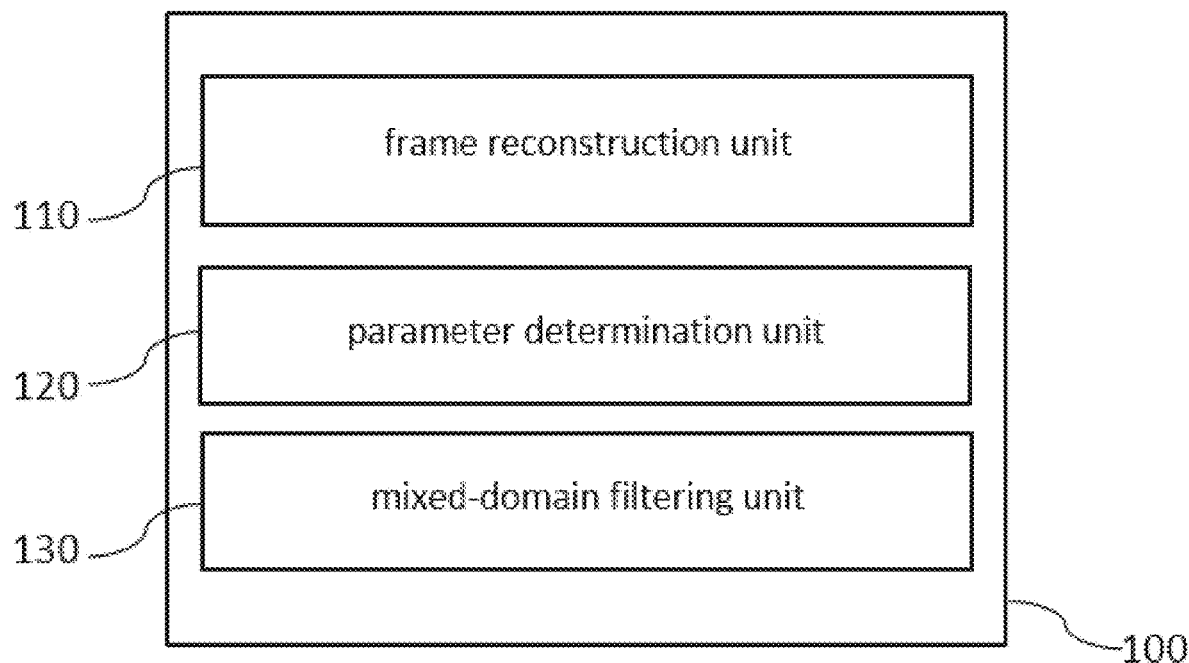
FIG. 1 is a block diagram illustrating a video coding apparatus in accordance with an embodiment of the present invention.

FIG. 1 shows a video coding apparatus 100 for encoding or decoding a frame of a video.

The video coding apparatus comprises a frame reconstruction unit 110, a parameter determination unit 120 and a mixed-domain filtering unit 130.

The frame reconstruction unit 110 is configured to reconstruct the frame.

The parameter determination unit 120 is configured to determine one or more filter parameters, based on one or more first parameters which are based on the reconstructed frame and one or more second parameters which are based on codec signaling information.

The mixed-domain filtering unit 130 configured to filter in a frequency domain and a pixel domain the reconstructed frame based on the determined filter parameters to obtain a filtered frame.

The video coding apparatus 100 can be an encoder and/or a decoder.

Figure 2:
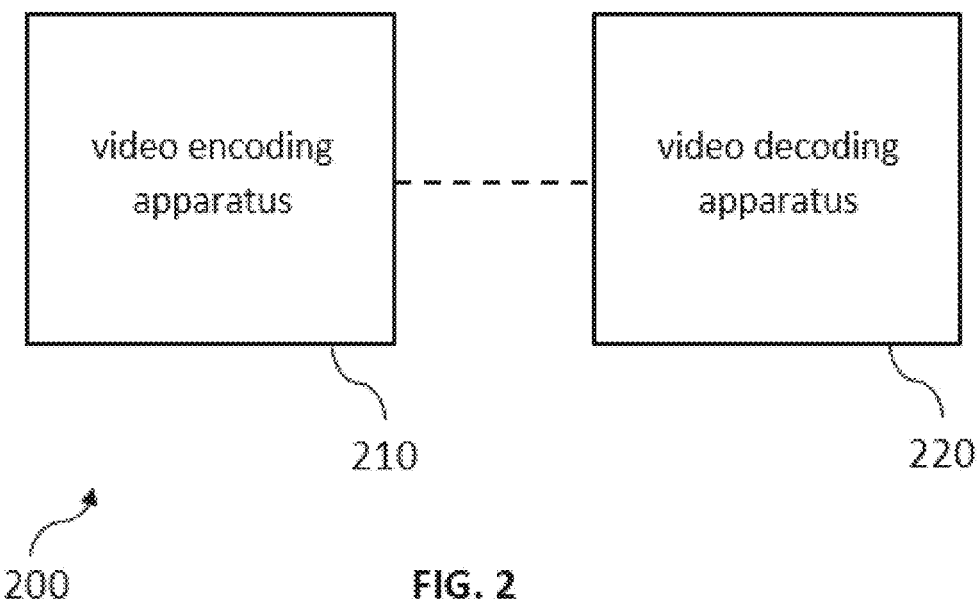
FIG. 2 is a block diagram illustrating a system comprising a video encoding apparatus and a video decoding apparatus in accordance with a further embodiment of the present invention.

FIG. 2 shows a system 200 comprising a video encoding apparatus 210 and a video decoding apparatus 220, wherein the parameter determination unit of the video encoding apparatus is configured to determine the filter parameters in the same way as the parameter determination unit of the video decoding apparatus. The dashed line between the video encoding apparatus 210 and the video decoding apparatus 220 indicates that a bitstream may be transferred from the video encoding apparatus 210 to the video decoding apparatus 220.

Figure 3:
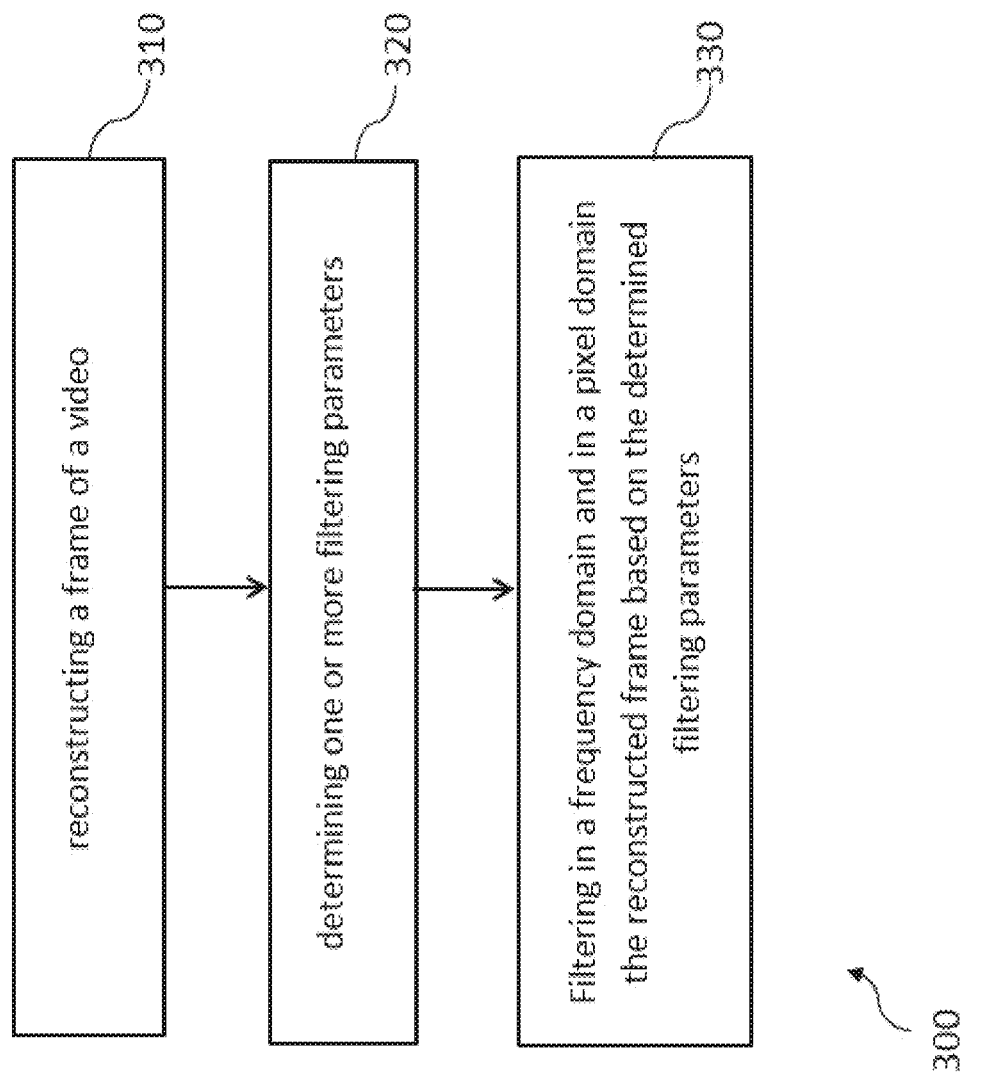
FIG. 3 is a flow chart of a method for video coding in accordance with an embodiment of the present invention.

FIG. 3 shows a method 300 for video coding.

The method comprises a first step of reconstructing 310 a frame of the video.

The method comprises a second step of determining 320 one or more filter parameters based on one or more first parameters which are based on the reconstructed frame and one or more second parameters which are based on codec signaling information.

The method comprises a third step of filtering 330 in a frequency domain and in a pixel domain the reconstructed frame based on the determined filter parameters to obtain a filtered frame.

The method 300 of FIG. 3 can be carried out e.g. by the video coding apparatus 100 of FIG. 1.

Figure 4:
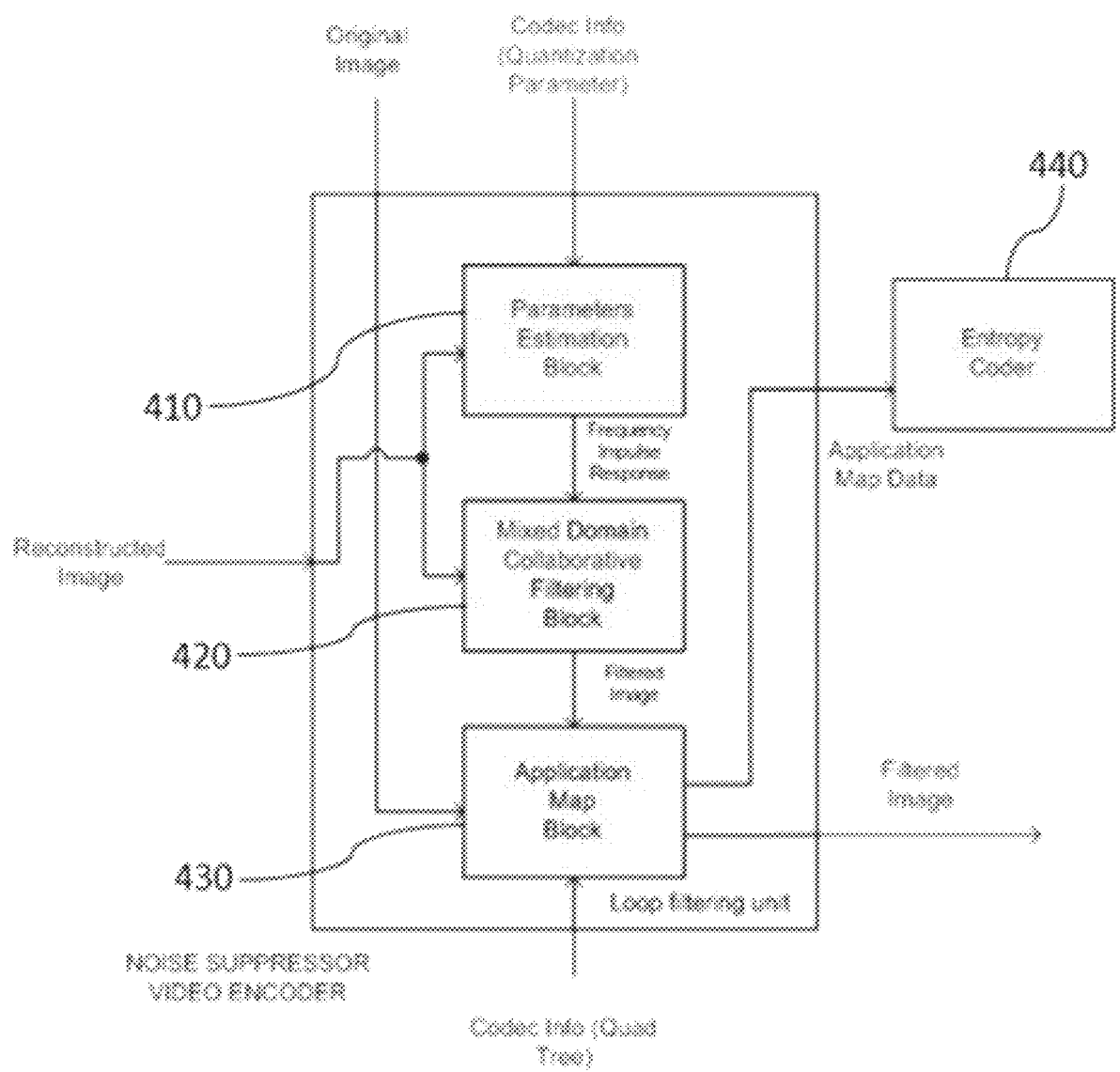
FIG. 4 is a block diagram of a loop filter in accordance with a further embodiment of the present invention.

FIG. 4 shows a block diagram of a loop filter 400. It comprises three blocks: a parameter estimation block 410, which is a parameter determination unit, a mixed domain collaborative filtering block 420, which is a mixed-domain filtering unit, and an application map block 430, which is an application map unit.

Similar to ALF, the parameter estimation block 410 calculates filter parameters. But in contrast to ALF, the filter parameters are calculated without knowledge about the source (original) images. The filter parameters are estimated based on two groups of input parameters. The first group of input parameters is estimated based on the reconstructed frame and the second group of input parameters is derived from service codec parameters which are already transferred from the encoder to the decoder in a general hybrid video codec.

The filter parameters can be estimated in the decoder, and therefore the filter parameters do not need to be transferred from the encoder to the decoder (in contrast to ALF). In ALF, the parameter estimation block calculates the pixel domain Impulse response but in the loop filter 400, the parameter estimation block estimates the frequency impulse response, because base filtering is performed in the frequency domain. The frequency domain implementation allows building a more efficient non-linear frequency domain filter.

In contrast to ALF, which performs local filtering of the reconstructed image in the pixel domain, non-local collaborative filtering of the reconstructed image is performed in a mixed domain (spatial frequency and pixel domain). Such approach allows more efficient usage of spatial redundancy. Initial filtering is performed in the frequency domain and the final averaging is performed in the pixel domain.

In contrast to ALF, the loop filter 400 does not perform matching (e.g. correlation) between filtered and original videos in order to estimate the filter parameters and therefore the filter 400 can suppress input sensor noise and improve prediction quality. Input noise is a useful signal for the end user. Therefore, the Application map block 430 during RDO process determines areas where filtering should be applied. The application map data are then provided to an entropy coder 440. The improvement in prediction and the removal of quantization noise from the decoded video is a benefit, while the degradation of the filtered decoded image is a drawback. If the benefit is significantly greater than the drawback, then filtering is applied. Otherwise the reconstructed video is used for prediction and as output for the end user. Benefit and drawback are estimated by a cost function which is a weighted sum of square errors between the original image and the filtered image and the number of bits for compressed image transmission.

If there is no matching (correlation) between filtered and original signal during the filter parameter estimation, then the filter 400 can suppress sensor noise. On the one hand, if filter suppresses the sensor noise, it will improve the prediction quality. On the other hand, it will decrease the quality of the decoded signal because sensor noise is a useful signal for the end user. The application map estimates which effect is bigger. If from the point of view of correlation between the filtered and original image it is better to improve prediction, then filtering will be performed. Otherwise it is better not to perform filtering.

Figure 5:
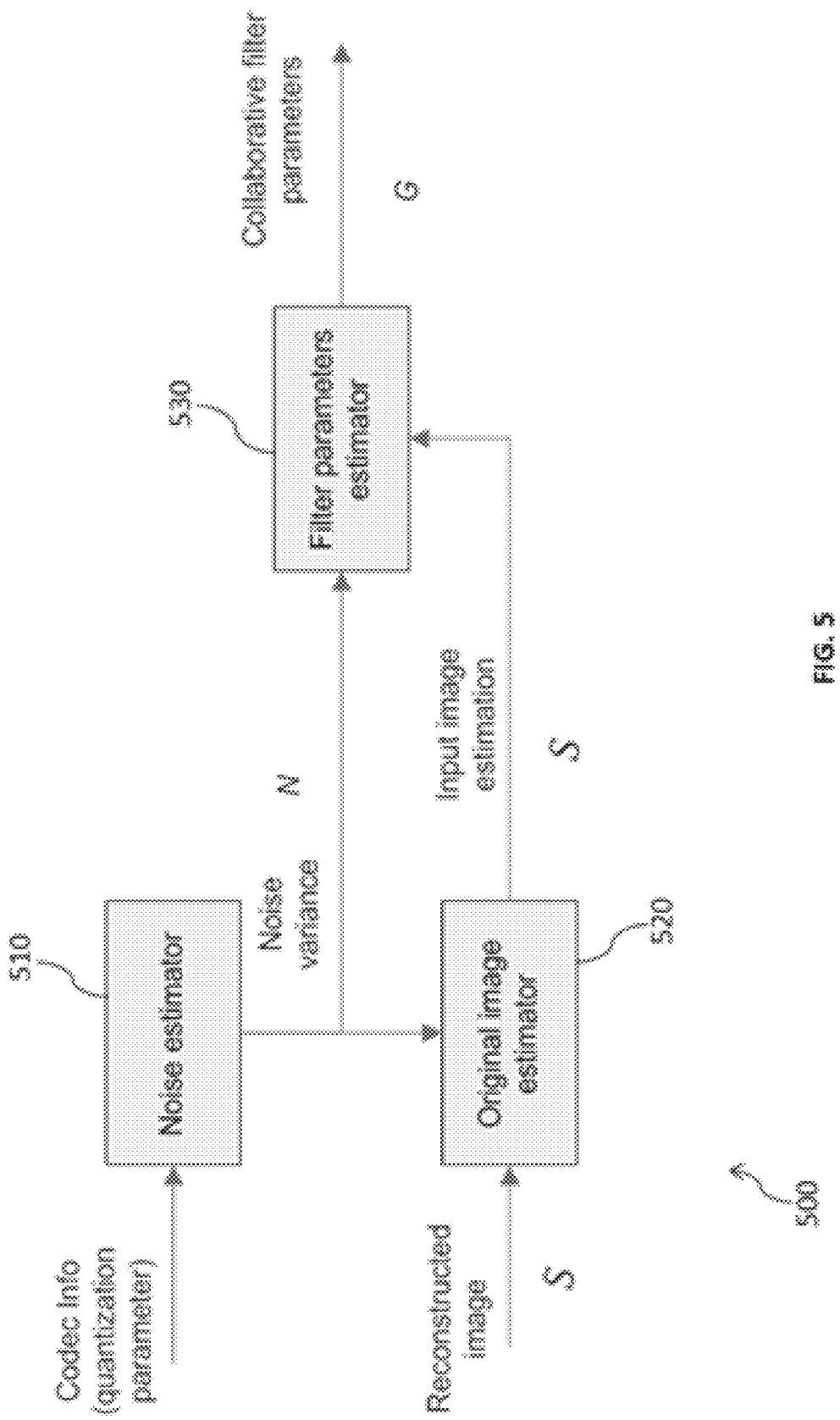
FIG. 5 is a block diagram of a parameter estimation block in accordance with a further embodiment of the invention.

FIG. 5 shows a block diagram of a parameter estimation block 500. The parameter estimation block 500 comprises a noise estimator 510, an original image estimator 520 and a filter parameter estimator 530.

The noise estimator 510 derives sensor and quantization noise variance as a function of the hybrid codec Quantization parameter QP.

The original image estimator 520 estimates original video (source video) from reconstructed (decoded) video. Only reconstructed video and noise variance are used for the source video estimation.

The filter parameter estimator 530 estimates collaborative filter parameters based on source image estimation and noise variance derived from encoder service parameters. In case the mixed domain collaborative filtering block (see FIG. 4) is implemented as a Wiener collaborative filter, the filter parameter estimator calculates the frequency impulse filter response. "Weiner" means that the filter minimizes the sum of squared errors between the filtered and original images. "Collaborative" means that information from several (>1) different correlated macroblocks from reconstructed images are used for filtering the current macroblock.

Figure 6:
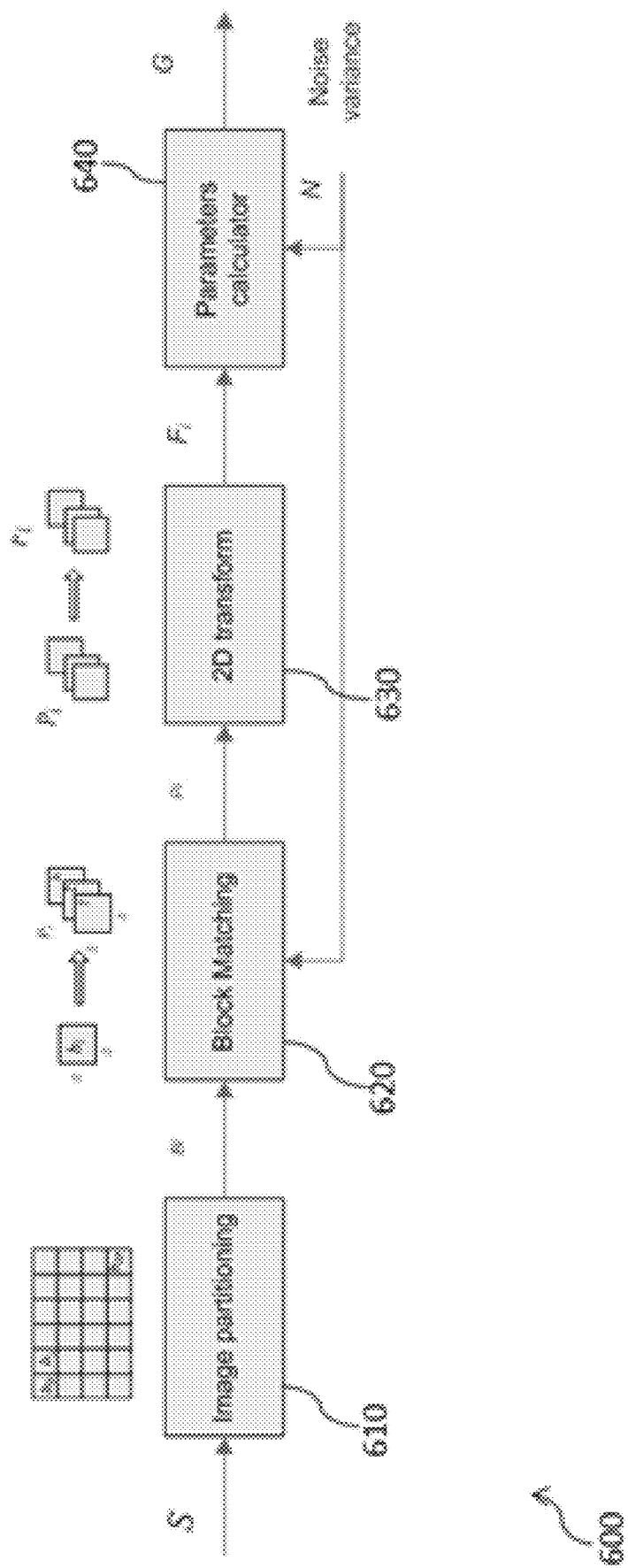
FIG. 6 is a block diagram of a filter parameter estimator in accordance with a further embodiment of the invention.

FIG. 6 shows a block diagram of a filter parameter estimator 600, e.g. the filter parameter estimator 530 of FIG. 5.

As shown in FIG. 6, the filter parameter estimator 600 may comprise an image partitioning block 610, a block matching block 620, a 2D transform block 630, and a parameters calculator block 640.

The image partitioning block 610 generates a set of macroblocks (macroblocks set) which cover the source frame estimate.

Then, for each macroblock from this set the block matching block 620 finds k nearest blocks using a minimum-square-error (MSE) metric. Found patches are grouped into clusters. For each patch from each cluster, a 2D transform is performed in the 2D transform block 630.

For each group of frequency domain patches (each frequency domain patch is the 2D spectrum of the pixel domain patch), collaborative filter parameters are calculated in the parameters calculator block 640. For the particular case of Wiener collaborative filter the frequency impulse response is calculated in the parameters calculator block 640.

FIG. 7 shows pseudo-code 700 of filter parameter estimation in detail for the general case and for the Wiener collaborative filter. According to the method of FIG. 7, in a first step of the processing chain (first processing step), the partitioning procedure creates a set of macroblocks $B=\{b_1, b_2, \ldots, b_M\}$ which covers the source frame estimate, where M denotes the amount of macroblocks and $b_i$ is the i-th reference macroblock.

Each macroblock will serve as a reference macroblock. Then for each reference macroblock k nearest blocks are found using MSE metric during block matching procedure $P_i=\text{BlockMatch}(\hat{S},b_i)=\{b_i, p_i^0, p_i^1, p_i^2, \ldots, p_i^{k-1}\}$, where $\hat{S}$ is the source frame estimation from reconstructed frame and $p_i^j$ is the j patch corresponding to $b_i$ reference macroblock.

In the next stage, for each pixel patch (block of pixels) from the pixel domain cluster $P_i$, 2D transform is performed.

Frequency domain cluster $F_i$ including 2D spectra of pixel domain patches from pixel domain cluster $P_i$ is used for estimating collaborative filter parameters (These filter parameters are used for filtering all patches from $P_i$). In general case filter parameters are a function of frequency domain cluster and noise variance, $G_i=\text{Func}(F_i,N)$.

For the particular case in which a Wiener collaborative filter is used, the frequency impulse response is determined by the following procedure. At the first step StackTransform( ) procedure is performed for each frequency domain cluster $F_i$.

Figure 8:
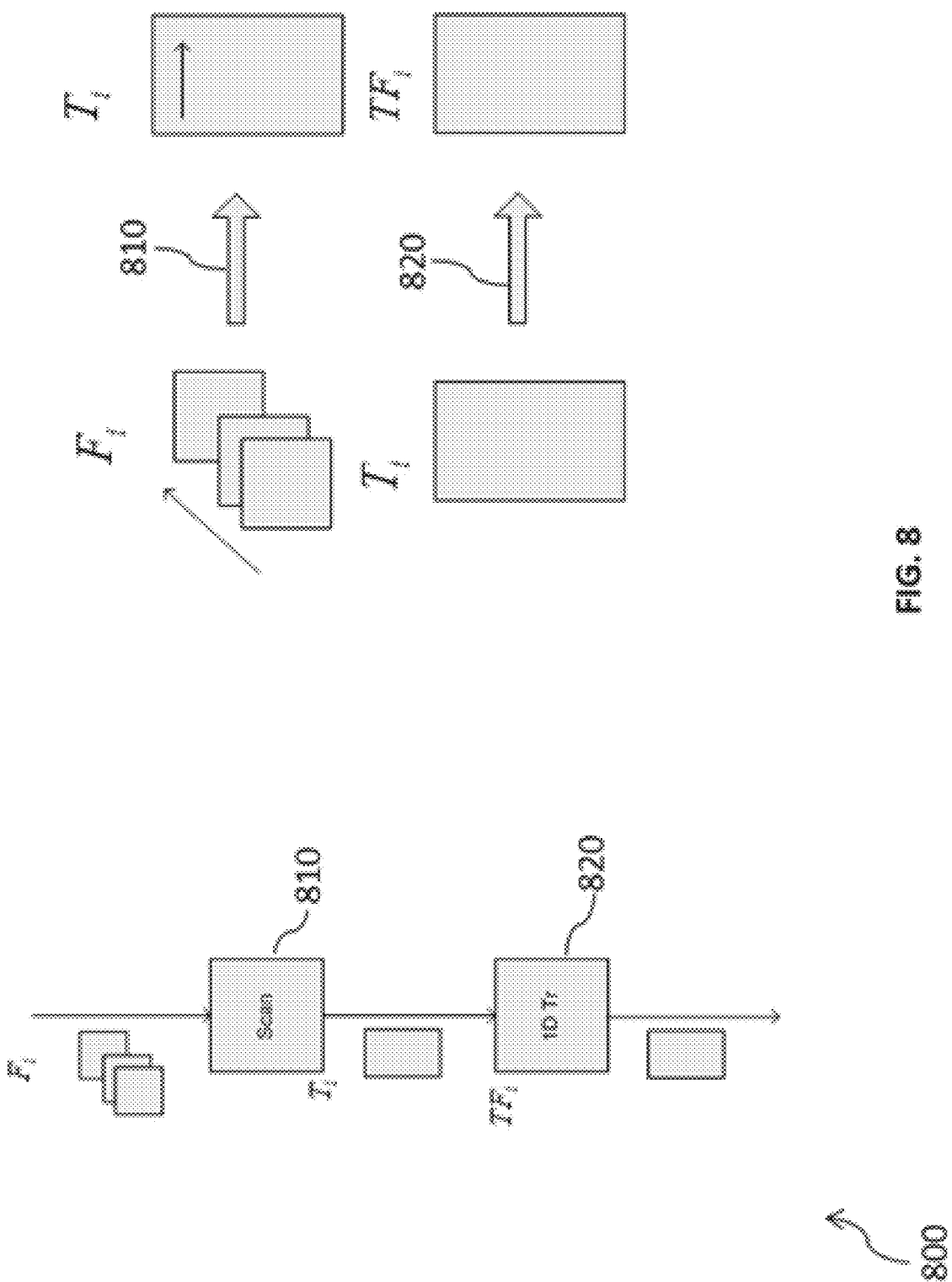
FIG. 8 is a schematic illustration of a StackTransform( ) procedure in accordance with a further embodiment of the invention.

FIG. 8 shows a schematic illustration of a StackTransform( ) procedure. The StackTransform( ) procedure is performed in two steps. In a first step, an auxiliary matrix $T_i$ is created by scanning 810 the frequency domain cluster $F_i$.

The following scanning rule is used: each row of matrix $T_i$ consists of frequency components from different patches of the same frequency domain cluster $F_i$ with the same spatial frequencies [v, w]:

$$T_i = \begin{pmatrix} t_1 \\ t_2 \\ \ldots \\ t_{n \times n} \end{pmatrix},$$

$$t_j = (f_i^0[v, w], f_i^1[v, w], \ldots, f_i^{k-1}[v, w]),$$

$$v = 0, \ldots, n-1;$$

$$w = 0, \ldots, n-1;$$

$$j = v \cdot n + w$$

where n×n is the total number of pixels in the respective macroblock, and k is the total number of patches in frequency domain cluster $F_i$. In the last step of the StackTransform( ) procedure, the output matrix $TF_i$ is created. Each row of the output matrix $TF_i$ is a 1D transform 820 of corresponding row of $T_i$ matrix.

Then the frequency impulse response matrix (with dimension n*n×k) of the Wiener collaborative filter is calculated based on elements of the $TF_i$ matrix. The elements $g_{vw}^i(\Omega)$ of the frequency impulse response matrix $G^i$ are determined by the following equation:

$$g_{vw}^i(\Omega) = \frac{(tf_{vw}^i(\Omega))^2}{(tf_{vw}^i(\Omega))^2 + N^2}$$

where $\Omega$ is the column index of the matrix $TF_i$ and also of the matrix $G^i$ and wherein the pair [v,w] of spatial frequencies v and w serves as the row index of matrix $TF_i$ and also of the matrix $G^i$. Each row of the matrix $G^i$ is an individual frequency impulse response corresponding to spatial frequencies [v, w]. Given the spatial frequencies [v, w], the column index $\Omega$ determines the filter gain for the coefficient of transform along different patches from one cluster.

Figure 9:
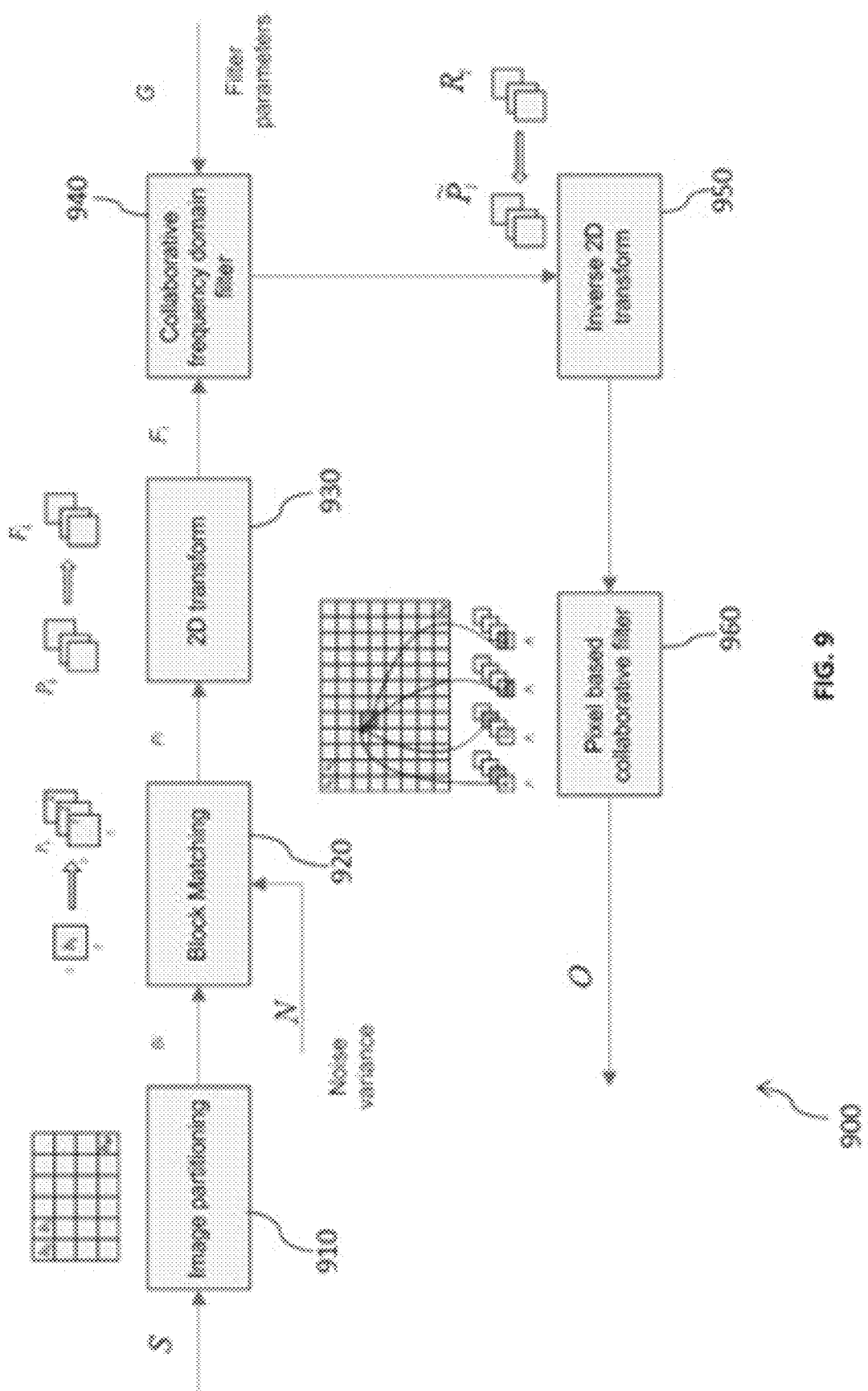
FIG. 9 is a schematic illustration of an operation of the collaborative filter in the mixed domain in accordance with a further embodiment of the invention.

FIG. 9 shows a schematic illustration of an operation of a collaborative filter 900 in the mixed domain (also referred to as the mixed-domain collaborative filter, which is a mixed-domain filtering unit). As shown, the mixed-domain collaborative filter comprises an image partitioning block 910, a block matching block 920, a 2D transform block 930, an inverse 2D transform block 950, and collaborative frequency and pixel domain filters 940, 960.

As in the filter parameter estimator block, the image partitioning block 910 creates a set of macroblocks (macroblock set) which covers the reconstructed frame. Then for each reference macroblock from this set, k nearest blocks are found using MSE metric by block matching block 920. In the next step, found spatial patches are combined in a pixel domain cluster corresponding to a reference macroblock.

The 2D transform block 930 applies a 2D transform to each patch in the chosen pixel domain cluster and produces a cluster in the frequency domain which consists of 2D spectra of corresponding pixel domain patches. The collaborative frequency domain filter 940 performs collaborative filtering of the 2D spectrum of the pixel domain patches using filter parameters calculated in the previous step. The inverse 2D transform block 950 transforms the filtered frequency-domain patches back to the pixel domain. The pixel-based collaborative filter 960 then performs final averaging of pixel domain patches corresponding to the reference macroblock.

FIG. 10 shows pseudo-code 1000 of the mixed-domain collaborative filter in detail for the general case. According to the method, in the first processing step, the partitioning procedure creates a set of macroblocks $B=\{b_1, b_2, \ldots, b_M\}$ which covers the reconstructed (decoded) frame, where M denotes the amount of macroblocks and $b_i$ is the i-th reference macroblock. Then for each reference macroblock $b_i$, k nearest blocks are found using MSE metric during block matching procedure $P_i=\text{BlockMatch}(S,b_i)=\{b_i, p_i^0, p_i^1, p_i^2, \ldots, p_i^{k-1}\}$, where s is the reconstructed frame and $p_i^j$ is the j patch corresponding to $b_i$ reference macroblock.

On the next stage for each patch from pixel domain cluster $P_i$ 2D transform is performed. Frequency domain cluster $F_i$ including 2D spectra of pixel domain patches from pixel domain cluster $P_i$ is used for collaborative filtering. In general case collaborative filter in frequency domain performs patches averaging in frequency domain and produces filtered patches in frequency domain $R_i=\text{FreqCollaborativeFiltering}(F_i, G_i)$ corresponding to patches in pixel domain. Inverse 2D transforms returns filtered patches in frequency domain $R_i$ to pixel domain and produces filtered patches in pixel domain $\tilde{P}_i$. On the last processing stage filtered patches in frequency domain $\tilde{P}_0, \tilde{P}_1, \ldots, \tilde{P}_M$ are averaged in pixel domain based on procedure SameBlockAvg( ) which will be described below.

FIG. 11 shows pseudo code 1100 for a collaborative filter in mixed domain for the case of Wiener filtering. As in general case reconstructed frame partitioning, block matching procedure and 2D transform should be performed. Then collaborative filtering of reconstructed frame patches in frequency domain should be performed. For this goal StackTransform( ) procedure described on FIG. 3 should be performed. Then Wiener filtering in frequency domain should be performed via stack (group) spectrum $TF_i$ multiplication by Wiener frequency impulse response $G_i$ calculated on previous step based source signal spectrum estimation and noise variance. After this procedure inverse stack transform over multiplication result should be performed to get filtered patches in frequency domain $R_i$. Then the same proceeding as in general case should be performed.

Figure 12:
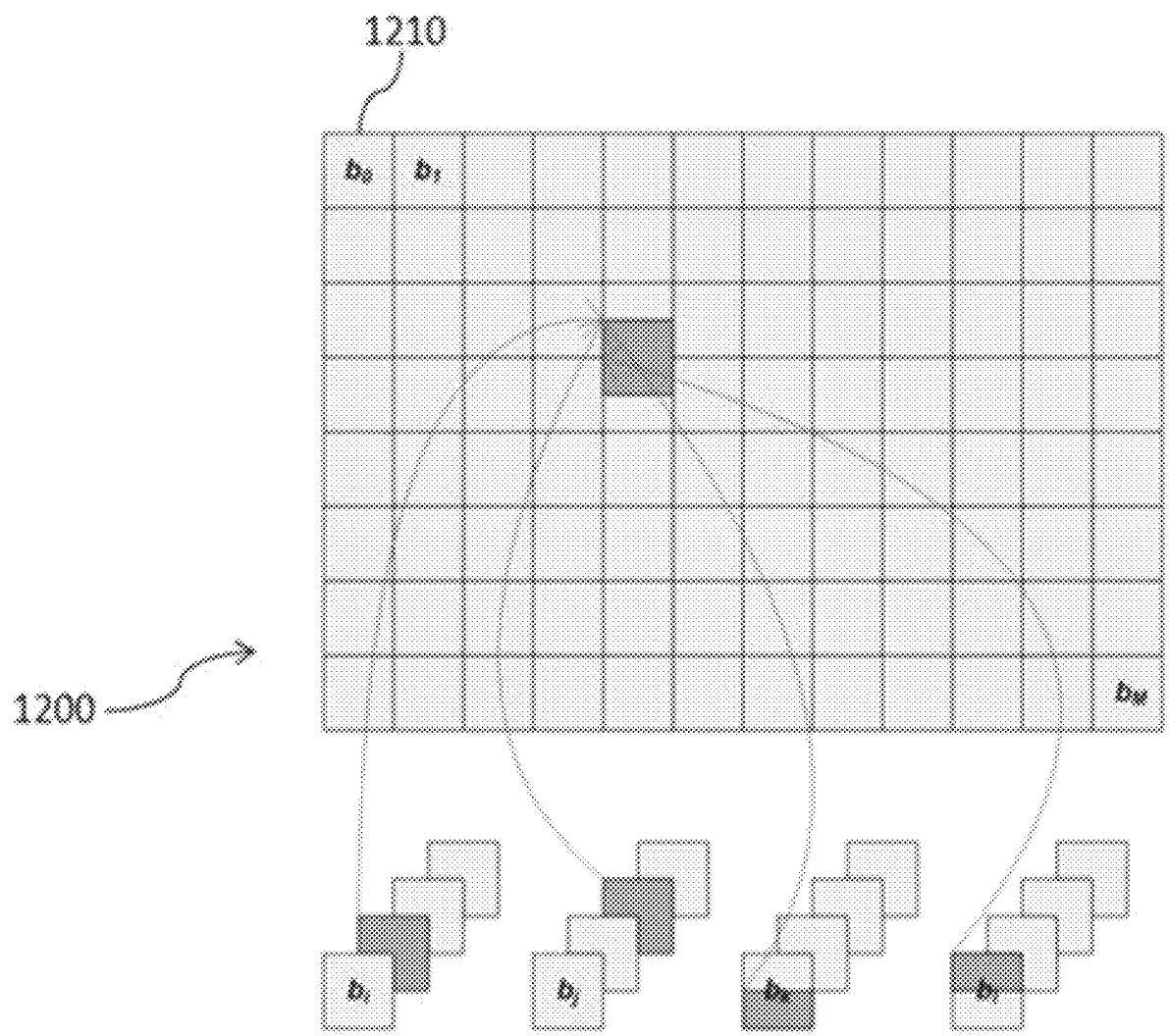
FIG. 12 is a schematic illustration of a collaborative filter in pixel domain (procedure SameBlockAvg( )) in accordance with a further embodiment of the invention.

FIG. 12 shows a schematic illustration of a collaborative filter in pixel domain (procedure SameBlockAvg( ). Filtering is based on the result of collaborative filtering in frequency domain. After collaborative filtering in frequency domain for each reference macroblock 1210 from a reconstructed frame 1200 there is a set of filtered similar blocks which can be used for noise averaging. If averaging is performed along spatial patches we can decrease noise from one side, but also we distort edges from other side. It is therefore preferred to perform averaging in a different way.

Each macroblock in the reconstructed frame can be reference for one cluster in pixel domain and secondary for other clusters in pixel domain. In each cluster averaging is performed independently and so the same patch can be filtered in different cluster by different ways. A collaborative filter in pixel domain averages the same patches (patches with fixed spatial coordinates) along all clusters which include this patch. This allows to decrease noise and introduce low edge distortion, because filtration in frequency domain allows saving source signal spectrum.

As mentioned above, the mixed filter can suppress not only quantization noise but also input sensor noise because the filter parameters are estimated without matching to the original signal. But the sensor noise is useful signal for end user, so benefit from prediction signal improvement/noise suppression and decoded signal distortion should be balanced. An application map module can perform this balancing.

Figure 13:
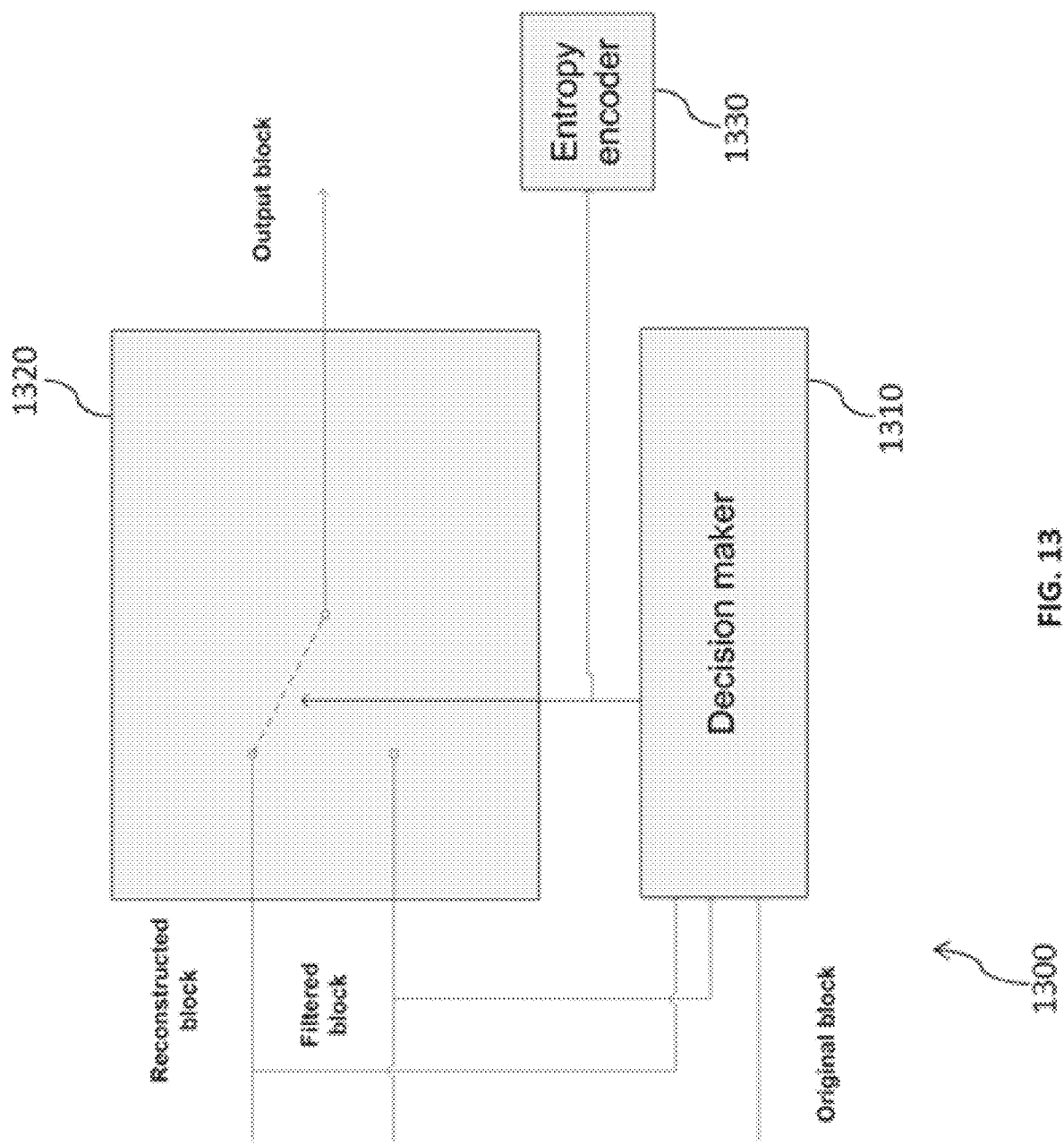
FIG. 13 is a block diagram of an Application map module in accordance with a further embodiment of the invention.

FIG. 13 shows a block diagram of an application map module 1300, which is an application map unit. The application map module 1300 determines which parts of the reconstructed frame should be filtered and which parts of the original reconstructed frame should be used for prediction and delivery for the end user. A block generation unit (not shown) generates a set of macroblocks which covers the reconstructed frame. Then for each macroblock a decision maker block 1310 makes a decision about whether or not the chosen macroblock shall be filtered.

Correspondingly, a switch 1320 chooses an output block to be either the reconstructed block or the filtered block. The decision may be made based on an RDO process. The decision may be encoded for the bitstream by an entropy encoder 1330. If the benefit from both prediction improvement and removal of quantization noise from the decoded video is significantly greater than the drawback from filtered decoded image degradation then filtering is applied. Otherwise, the reconstructed video is used for prediction and as output for end user. The application map block decisions are encoded and transferred from the encoder to the decoder.

Further embodiments of the present invention may include:
1. A method and an apparatus for predictive coding a video stream of subsequent frames into an encoded video bit stream, comprising:
   1) reconstructing video generator corresponding to coded video data
   2) adaptive loop filter in mixed domain (spatial frequency and pixel domain) applied to reconstructing video frame for post filtering (improvement of decoded signal) and in-loop filtering (prediction improvement), where some of the filter parameters (=first subset of filter parameters) are estimated from reconstructed video signal and some of the filter parameters (=second subset of filter parameters) are derived from encoder service information which is already encoded into the bitstream and is used for encoded signal reconstruction in codecs without adaptive loop filter (in other words, there is no additional bit budget for transmitting the second subset of parameters, because these parameters are already transmitted in video codecs without loop filters).
2. Same as previous, where any frame from the Decoded Picture Buffer can be used for filter parameter estimation.
3. Same as previous, where both subsets of the adaptive loop filter parameters can be derived in the decoder and so should not be encoded into bitstream.
4. Same as previous, where an application map is implemented on the filter output for optimal tradeoff between sensor quantization noise suppression and decoded video degradation.
5. Same as previous, where filter parameter estimation is based on original image estimation from reconstructed signal and quantization noise estimation.
6. Same as previous, where original image estimation is based on reconstructed image only.
7. Same as previous, where noise estimation is a function of the encoder quantization parameter (QP)
8. Same as previous, where the collaborative adaptive loop filter in the mixed domain (spatial frequency and pixel domain) comprises the following steps (see FIG. 9):
   1) Generate a set of patches (blocks) that cover the reconstructed image
   2) Run a loop over all blocks. Refer to the current block of the loop as the reference block. The loop includes steps 3) to 8) described below.
   3) Spatial search of patches (blocks) similar to the reference block
   4) Group found patches to clusters
   5) 2D transform of each patch from cluster
   6) collaborative filtering in frequency domain of 2D spectra corresponding to pixel patches (blocks) from one cluster
   7) Inverse 2D transform of filtered 2D spectra corresponding to pixel patches (blocks) from one cluster into pixel domain
   8) Pixel domain averaging of pixel patches which were filtered in frequency domain with the same spatial coordinates from different patches clusters
9. Same as previous, where Haar wavelet transform is used as 2D transform.
10. Same as previous, where Wiener collaborative filtering in frequency domain is used as collaborative filtering in frequency domain.
11. Same as previous, where adaptive_filtering_flag flag is used for event signaling when proposed compression tool should be used
12. Same as previous, where frame_level_usage_flag flag is used for signaling case when whole reconstructed frame should be filtered
13. Same as previous, where macroblock size determines macroblock size which should be used for filtering
14. Same as previous, where use_filtered_mb_flag flag shows whether filtered macroblock should be used The foregoing descriptions are only implementation manners of the present invention, the scope of the present invention is not limited to this. Any variations or replacements can be easily made through person skilled in the art. Therefore, the protection scope of the present invention should be subject to the protection scope of the attached claims.

What is claimed is:
1. A video coding apparatus for encoding or decoding a frame of a video, the video coding apparatus comprising:
   a computer-readable storage medium storing program code; and
   a processor,
   wherein when executed by the processor, the program code causes the processor to:
   reconstruct the frame;

determine one or more filter parameters, based on one or more first parameters which are based on the reconstructed frame and one or more second parameters which are based on codec signaling information;
filter in a frequency domain and a pixel domain the reconstructed frame based on the determined one or more filter parameters to obtain a filtered frame;
estimate the original frame from the reconstructed frame and determine the one or more first parameters based on the estimated original frame;
determine the one or more filter parameters by:
partitioning the estimated original frame into blocks; and
for each of the blocks:
determine a cluster of patches that are similar to the block;
2D-transform the cluster of patches to obtain transformed patches; and
determine the one or more first parameters based on the transformed blocks
determine, for each of the blocks, the one or more filter parameters based on the transformed patches by:
regroup elements of the transformed patches to obtain a matrix $T_i$, wherein each row of the matrix $T_i$ comprises frequency components with same spatial frequencies;
transform the matrix $T_i$ to obtain a transformed matrix $tf_{vw'}^{i}$, wherein each row of the matrix $tf_{vw'}^{i}$ is a 1D transform of a corresponding row of matrix $T_i$.

2. The video coding apparatus of claim 1, wherein the program instructions further cause the processor to store the filtered frame in a decoder picture buffer for next frame prediction and to output the filtered frame.

3. The video coding apparatus of claim 1, wherein the program instructions further cause the processor to determine where filtering should be implemented based on a weighted function of a prediction improvement and an output video degradation.

4. The video coding apparatus of claim 1, wherein the program instructions further cause the processor to:
store a plurality of reconstructed frames in a decoded picture buffer; and
determine the one or more first parameters based on one or more frames of the decoded picture buffer.

5. The video coding apparatus of claim 1, wherein the program instructions further cause the processor to:
determine a quantization noise value from the codec signaling information; and
determine the one or more second parameters based on the derived quantization noise value.

6. The video coding apparatus of claim 1, wherein the program instructions further cause the processor to, for each of a set of blocks of the reconstructed frame:
determine a set of patches that are similar to the block;
2D-transform the patches into the frequency domain to obtain frequency-domain patches;
perform collaborative filtering of the frequency-domain patches in the frequency domain to obtain transformed frequency-domain patches;
inverse 2D transform the filtered transformed frequency-domain patches in the frequency domain to obtain filtered patches; and
perform collaborative filtering of the filtered patches in the pixel domain along pixel patches from different sets of patches with the same spatial coordinates.

7. The video coding apparatus of claim 6, wherein the program instructions further cause the processor to perform, for each of the blocks, the collaborative filtering based on the transformed patches by:
regrouping elements of the transformed patches to obtain a matrix $T_i$, wherein each row of the matrix $T_i$ comprises frequency components with same spatial frequencies; and
transforming the matrix $T_i$ to obtain a transformed matrix, wherein each row of the matrix is a 1D transform of a corresponding row of matrix $T_i$.

8. The video coding apparatus of claim 1, wherein for 2D-transforming the cluster of patches to obtain transformed patches, the program instructions further cause the processor to at least one of:
perform the 2D transforming using a Haar wavelet transform; and
perform the 1D transformation using a Hadamard transform.

9. The video coding apparatus of claim 1, wherein the program instructions further cause the processor to at least one of:
use an adaptive_filtering_flag flag to indicate that a frame should be filtered;
use a frame_level_usage_flag flag to indicate that the entire reconstructed frame should be filtered;
use a macroblock size field to indicate a macroblock size which should be used for the filtering; and
use a use_filtered_mb_flag flag to indicate whether a filtered macroblock should be used in the method.

10. A system comprising:
the video coding apparatus according to claim 1, wherein the video coding apparatus further comprises:
a video encoding apparatus; and
a video decoding apparatus,
wherein:
the video encoding apparatus transfers a bitstream to the video decoding apparatus; and
the program instructions further cause the processor to determine the one or more filter parameters for the video decoding apparatus in the same way as the one or more filter parameters are determined for the video encoding apparatus.

11. A method for video coding, the method comprising:
reconstructing a frame of a video;
determining one or more filter parameters based on one or more first parameters which are based on the reconstructed frame and one or more second parameters which are based on codec signaling information; and
filtering in a frequency domain and in a pixel domain the reconstructed frame based on the determined filtering parameters to obtain a filtered frame
estimating the original frame from the reconstructed frame and determine the one or more first parameters based on the estimated original frame;
determining the one or more filter parameters by:
partitioning the estimated original frame into blocks; and
for each of the blocks:
determining a cluster of patches that are similar to the block;
2D-transforming the cluster of patches to obtain transformed patches; and
determining the one or more first parameters based on the transformed blocks determining, for each of the blocks, the one or more filter parameters based on the transformed patches by:
regrouping elements of the transformed patches to obtain a matrix $T_i$, wherein each row of the matrix $T_i$ comprises frequency components with same spatial frequencies; and
transforming the matrix $T_i$ to obtain a transformed matrix $tf_{vw}^i$, wherein each row of the matrix $tf_{vw}^i$ is a 1D transform of a corresponding row of matrix $T_i$.

12. A non-transitory computer-readable storage medium storing program code, the program code comprising instructions that when executed by a processor, cause the processor to carry out a method for video coding comprising the steps of:
reconstructing a frame of a video;
determining one or more filter parameters based on one more first parameters which are based on the reconstructed frame and one or more second parameters which are based on codec signaling information;
filtering in a frequency domain and in a pixel domain the reconstructed frame based on the determined filtering parameters to obtain a filtered frame
estimating the original frame from the reconstructed frame and determine the one or more first parameters based on the estimated original frame;
determining the one or more filter parameters by:
partitioning the estimated original frame into blocks; and
for each of the blocks:
determining a cluster of patches that are similar to the block;
2D-transforming the cluster of patches to obtain transformed patches; and
determining the one or more first parameters based on the transformed blocks
determining, for each of the blocks, the one or more filter parameters based on the transformed patches by:
regrouping elements of the transformed patches to obtain a matrix $T_i$, wherein each row of the matrix $T_i$ comprises frequency components with same spatial frequencies; and
transforming the matrix $T_i$ to obtain a transformed matrix $tf_{vw}^i$, wherein each row of the matrix $t_{vw}^i$ is a 1D transform of a corresponding row of matrix $T_i$.

13. The video coding apparatus of claim 1, wherein to determine, for each of the blocks, the one or more filter parameters based on the transformed patches, the program instructions further cause the processor to determine, for each of the blocks, the one or more filter parameters based on the transformed blocks by:
determining the one or more filter parameters $g_{v,w}^i$ as:

$$g_{vw}^i(\Omega) = \frac{(tf_{vw}^i(\Omega))^2}{(tf_{vw}^i(\Omega))^2 + N^2}$$

wherein $\Omega$ is a column number in matrix $tf_{vw}^i$, spatial frequencies v, w correspond to a j-th row of matrix $tf_{vw}^i$ and N is a quantization noise value derived from the codec signaling information.

14. The video coding apparatus of claim 7, wherein to perform, for each of the blocks, the collaborative filtering based on the transformed patches, the program instructions further cause the processor to perform, for each of the blocks, the collaborative filtering based on the transformed patches by:
performing filtering by multiplying each element of matrix $tf_{vw}^i$ by a filter frequency impulse response $g(\Omega)_{vw}^i$,
wherein $\Omega$ is a column number in matrix $tf_{vw}^i$ and spatial frequencies v,w correspond to a j-th row of matrix $tf_{vw}^i$.

* * * * *